US007353105B2

(12) United States Patent
Mino et al.

(10) Patent No.: US 7,353,105 B2
(45) Date of Patent: Apr. 1, 2008

(54) ENGINE CONTROL DEVICE FOR CONSTRUCTION MACHINERY

(75) Inventors: Hisaho Mino, Chiba (JP); Nobuyuki Baba, Chiba (JP)

(73) Assignee: Sumitomo (SHI) Construction Machinery Manufacturing Co., Ltd., Chiba-Ken (JP)

( * ) Notice: Subject to any disclaimer, the term of this patent is extended or adjusted under 35 U.S.C. 154(b) by 0 days.

(21) Appl. No.: 11/523,236

(22) Filed: Sep. 19, 2006

(65) Prior Publication Data

US 2007/0150166 A1 Jun. 28, 2007

(30) Foreign Application Priority Data

Dec. 27, 2005 (JP) ............................. 2005-374406

(51) Int. Cl.
*G06F 19/00* (2006.01)
*F02D 41/00* (2006.01)

(52) U.S. Cl. ....................................... 701/110; 123/350

(58) Field of Classification Search .................. 701/50, 701/84, 93, 102, 110, 115; 180/290; 123/350, 123/361, 399, 478, 480
See application file for complete search history.

(56) References Cited

U.S. PATENT DOCUMENTS 6,052,633 A * 4/2000 Fukuyama et al. ........... 701/41

FOREIGN PATENT DOCUMENTS

| | | |
|---|---|---|
| JP | 07-189764 | 7/1995 |
| JP | 2004-076649 | 3/2004 |

* cited by examiner

*Primary Examiner*—Willis R. Wolfe
*Assistant Examiner*—Johnny H. Hoang
(74) *Attorney, Agent, or Firm*—Fattibene and Fattibene; Paul A. Fattibene; Arthur T. Fattibene

(57) ABSTRACT

There is provided construction machinery for switchably controlling rotational speed between a normal and an energy saving mode. Change in workload is detected by means except for change in pressure of a main circuit. It is more convenient to use the machinery in the energy saving mode, increasing opportunities for use in the energy saving mode to suppress fuel consumption and noise. An engine controlling device for construction machinery for switchably controlling the rotational speed of an engine between a normal mode in the range of a higher rotational speed and an energy saving mode in the range of a lower rotational speed includes a vehicle speed sensor 15, an ECM 12 for controlling the rotational speed of the engine 11, and an on-board controller 13 for sending a command signal to the ECM 12 based on the value detected by the vehicle speed sensor 15 to switch the rotational speed of the engine to either the normal mode or the energy saving mode; wherein when a vehicle speed is changed by workload in the energy saving mode to be lower than a predetermined range, the on-board controller 13 commands the ECM 12 to switch the rotational speed of the engine to the normal mode.

4 Claims, 15 Drawing Sheets

ENGINE CONTROL DEVICE FOR CONSTRUCTION MACHINERY

BACKGROUND OF THE INVENTION

1. Field of the Invention

The present invention relates to an engine control device for construction machinery, and in particular, to an engine control device for road pavement machines such as asphalt finisher and the like in construction machinery for switchably controlling the rotational speed of an engine between a normal mode in the range of a higher rotational speed and an energy saving mode in the range of a lower rotational speed.

2. Description of the Related Art

In this kind of conventional construction machinery, an engine control device has been known in which an on-board controller controls a regulator of a hydraulic pump to output a pump inclined rotation command signal through a solenoid proportional valve based upon a pressure signal sent from a pressure sensor provided on the main circuit at the discharge port of the hydraulic pump. The on-board controller relatively computes a calculated pump absorption horsepower and engine horsepower based on an engine performance curve in the rotational speed of an engine at that time, on the basis of that, the on-board controller outputs a rotational command signal to the governor of the engine (refer to Patent Document 1).

In addition to the above, an energy saving circuit for construction machinery has been known in which switching a normal and an energy saving mode to each other with a switch switchably forms the rotational speed of an engine between a high or a low speed and an automatic mode is also set. An on-board controller monitors a signal from a sensor for detecting a negative control signal predetermined at the time of selecting the automatic mode, and an optimum mode is automatically selected between the normal and the energy saving mode based on the detected signal of the sensor (refer to, for example, Patent Document 2).

Patent Document 1: Japanese Patent Laid-Open No. Hei7-189764

Patent Document 2: Japanese Patent Laid-Open No. 2004-76649

In the invention described in Patent Document 1, the on-board controller determines workload based on the pressure signal from the pressure sensor provided on the main circuit and outputs the rotational command signal to the governor according to workload, thereby allowing construction machinery such as hydraulic shovel and the like to output engine horsepower suited to workload. Road pavement machinery such as asphalt finisher and the like intermittently drives a conveyer, screw spreader and others. Rotating and controlling an engine based on change in pressure may change the rotation of a driving motor with fluctuation in load. Lowering in vehicle speed will adversely affect finishing on a paved surface.

In the invention described in Patent Document 2, the rotational speed of an engine is automatically switched to either the normal mode in the range of a higher rotational speed or the energy saving mode in the range of a lower rotational speed when pressure in the negative control circuit is increased by workload, thereby enabling energy saving even at the time of bleeding off, for example, at the time of boom lowering operation. However, as is the case with the Patent Document 1, rotating and controlling the engine based on change in pressure will adversely affect finishing on a paved surface in the road pavement machinery.

Then, problems to be solved arise to realize construction machinery for switchably controlling the normal mode and the energy saving mode, in which change in workload is detected with using other means instead of using change in pressure of a main circuit, which makes it more convenient to use the energy saving mode, thereby increasing opportunities for use in the energy saving mode, and suppressing fuel consumption and noise. The present invention is for its purpose to solve the above problem.

SUMMARY OF THE INVENTION

The present invention has been made to achieve the above purpose. The present invention provides an engine controlling device for construction machine for switchably controlling the rotational speed of an engine between a normal mode in the range of a higher rotational speed and an energy saving mode in the range off a lower rotational speed including: speed detecting means for detecting vehicle speed; engine electronic controlling means for controlling the rotational speed of the engine; and an onboard controller for sending a command signal to the engine electronic controlling means based on the value detected by the speed detecting means to switch the rotational speed of the engine to either the normal mode or the energy saving mode; wherein when vehicle speed is changed by workload in the energy saving mode to be lower than a predetermined range, the on-board controller commands the engine electronic controlling means to switch the rotational speed of the engine to the normal mode.

According to the configuration, the vehicle speed detecting means detects the vehicle speed of construction machinery, and an on-board controller commands the engine electronic controlling means to increase the rotational speed of the engine to switch the rotational speed of the engine to the normal mode when vehicle speed becomes lower than a predetermined range according as the rotational speed of the engine is lowered with increase in workload. The engine controlling means receives the command and increases the rotational speed of the engine to the rotational speed prescribed in the normal mode.

In another embodiment, the present invention provides an engine controlling device for construction machinery wherein when workload is reduced to increase a vehicle speed to the predetermined, range after the rotational speed of the engine has been switched to the normal mode, the onboard controller commands the engine electronic controlling means to switch the rotational speed of the engine to the energy saving mode.

According to the configuration, the on-board controller commands the engine electronic controlling means to decrease the rotational speed of the engine by switching the rotational speed of the engine to the energy saving mode when vehicle speed rises to a predetermined range because of decrease in workload after the rotational speed of the engine has been switched to the normal mode. The engine controlling means receives the command and decreases the rotational speed of the engine to the rotational speed prescribed in the energy saving mode.

In the invention according to one embodiment, the on-board controller determines that decrease in vehicle speed in the energy saving mode is caused by increase in workload and then increases the rotational speed of the engine, which prevents finishing on the paved surface from degrading because of a stall or decrease in vehicle speed.

In the invention according to another embodiment, the onboard controller lowers the rotational speed of the engine when vehicle speed rises to reach the predetermined range after the rotational speed of the engine has increased, reducing fuel consumption, which contributes to energy saving.

Thus, it becomes more convenient to use the machinery in the energy saving mode to increase opportunities for use in the mode, suppressing fuel consumption and noise.

DESCRIPTION OF SYMBOLS

| | |
|---|---|
| 11: | ENGINE |
| 12: | ECM (ENGINE ELECTRONIC CONTROLLING MEANS) |
| 13: | ON-BOARD CONTROLLER |
| 14: | HYDRAULIC EQUIPMENT IN TRAVELING SYSTEM, |
| 15: | VEHICLE SPEED SENSOR |
| 16: | ROTATIONAL SENSOR |
| A: | PREDETERMINED RANGE |
| B: | DANGEROUS RANGE |

DETAILED DESCRIPTION OF THE PREFERRED EMBODIMENTS

An engine control device for construction machinery related to the present invention is described in the following with reference to preferred embodiments. There is provided construction machinery for switchably controlling rotational speed between a normal and an energy saving mode. Change in workload is detected by means except for change in pressure of a main circuit. It is more convenient to use the machinery in the energy saving mode, increasing opportunities for use in the energy saving mode to suppress fuel consumption and noise. To achieve the above purpose, the present invention realizes an engine controlling device for construction machinery for switchably controlling the rotational speed of an engine between a normal mode in the range of a higher rotational speed and an energy saving mode in the range of a lower rotational speed including speed detecting means for detecting vehicle speed, engine electronic controlling means for controlling the rotational speed of the engine and an on-board controller for sending a command signal to the engine electronic controlling means based on the value detected by the speed detecting means to switch the rotational speed of the engine to either the normal mode or the energy saving mode, wherein when a vehicle speed is changed by workload in the energy saving mode to be lower than a predetermined range, the on-board controller commands the engine electronic controlling means to switch the rotational speed of the engine to the normal mode.

First Embodiment

Figure 1:
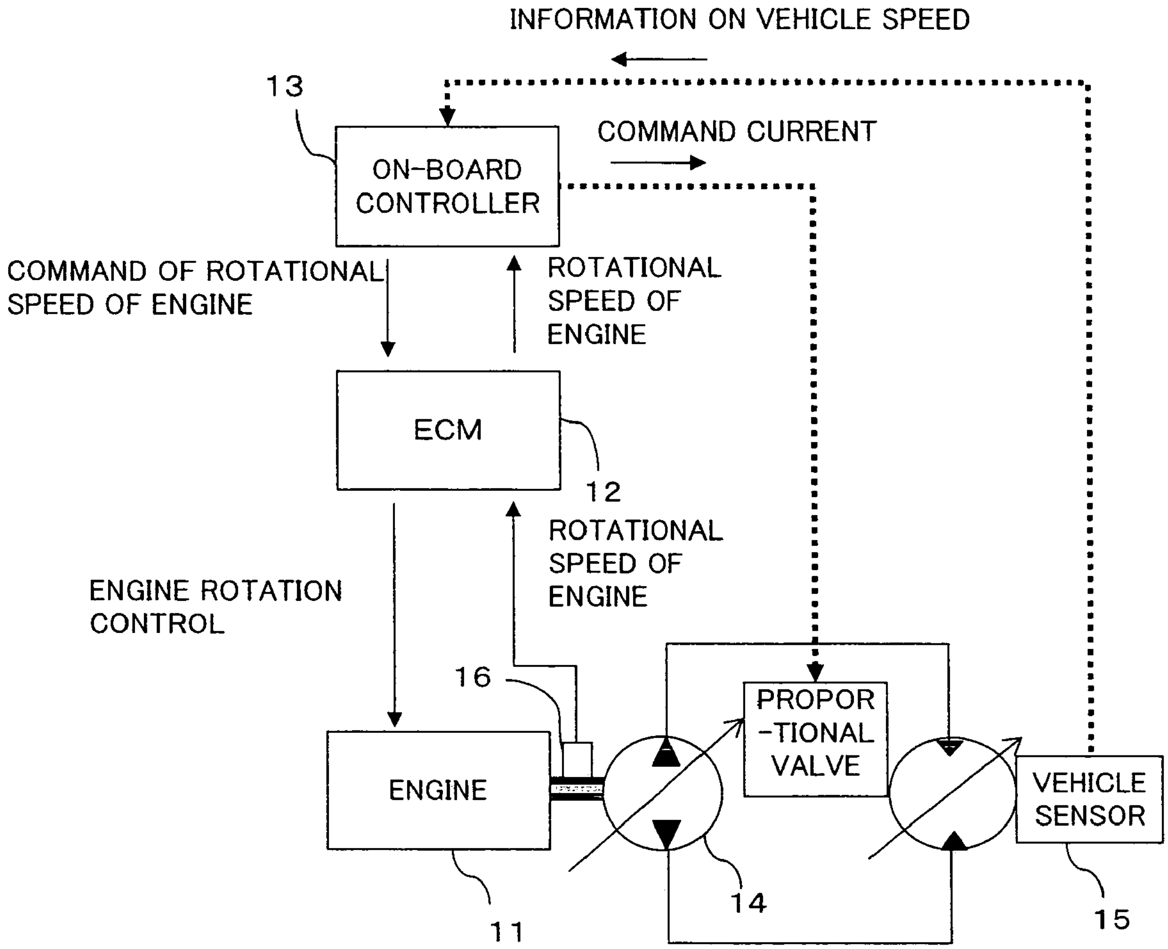
FIG. 1 shows a general configuration of an engine control device for an asphalt finisher to which the present invention is applied.

FIG. 1 shows a general configuration of an engine control device for an asphalt finisher as an example of construction machinery. An ECM 12 (or ECU) functioning as engine electronic controlling means adjusts a fuel injection quantity and injection timing of an engine 11 through the signal thereof to control the rotational speed of the engine. A rotational speed signal of the engine is sent from the ECM 12 to an on-board controller 13.

The on-board controller 13 sends a command signal to hydraulic equipment 14 in the traveling system such as a hydraulic pump and hydraulic motor to adjust the flow rate or tilt angle of the hydraulic equipment 14 in the traveling system and to control the rotational speed of the hydraulic motor or traveling motor, which determines the vehicle speed of an asphalt finisher. The hydraulic motor is provided with a vehicle speed sensor 15 as a means of detecting a vehicle speed. The detected signal of the vehicle speed sensor 15 is sent to the on-board controller 13.

The ECM 12 electronically controls fuel injection of the engine 11. The ECM 12 transmits data to and receives it from the on-board controller 13. When the on-board controller 13 sends a command for rotational speed of the engine to the ECM 12, the ECM 12 adjusts the fuel injection, injection timing and others to control the rotational speed of the engine. Then, a rotational sensor 16 detects the rotational speed of the engine 11, and the data is sent from the ECM 12 to the on-board controller 13.

The control of vehicle speed is described below. The on-board controller 13 causes a command current to flow to the hydraulic equipment 14 in the traveling system to change the discharge quantity of the hydraulic pump, thereby to control the rotational speed of the hydraulic motor, which changes the vehicle speed. Two modes of the rotational speed of the engine have been set; normal mode which is higher in rotational speed and energy saving mode which is lower in rotational speed. The modes can be automatically switched by the on-board controller 13 or manually switched by the switch.

In the present embodiment, the rotational speed of the hydraulic motor is detected by the above vehicle speed sensor 15, and sent to the on-board controller 13 as information on vehicle speed. The on-board controller 13 calculates vehicle speed from the detected signal and feeds it back to the hydraulic equipment 14 to keep vehicle speed constant while varying the command current.

Since the finisher travels at a lower speed during paving, the controller 13 performs a feedback control in the energy saving mode which is lower in rotational speed, however, when the finisher performs a spin turn or the vehicle speed sensor 15 breaks down to cause an error, the controller 13 performs not a feedback control even if the finisher travels at a lower speed, but an open control that outputs a predetermined command current.

Figure 2:
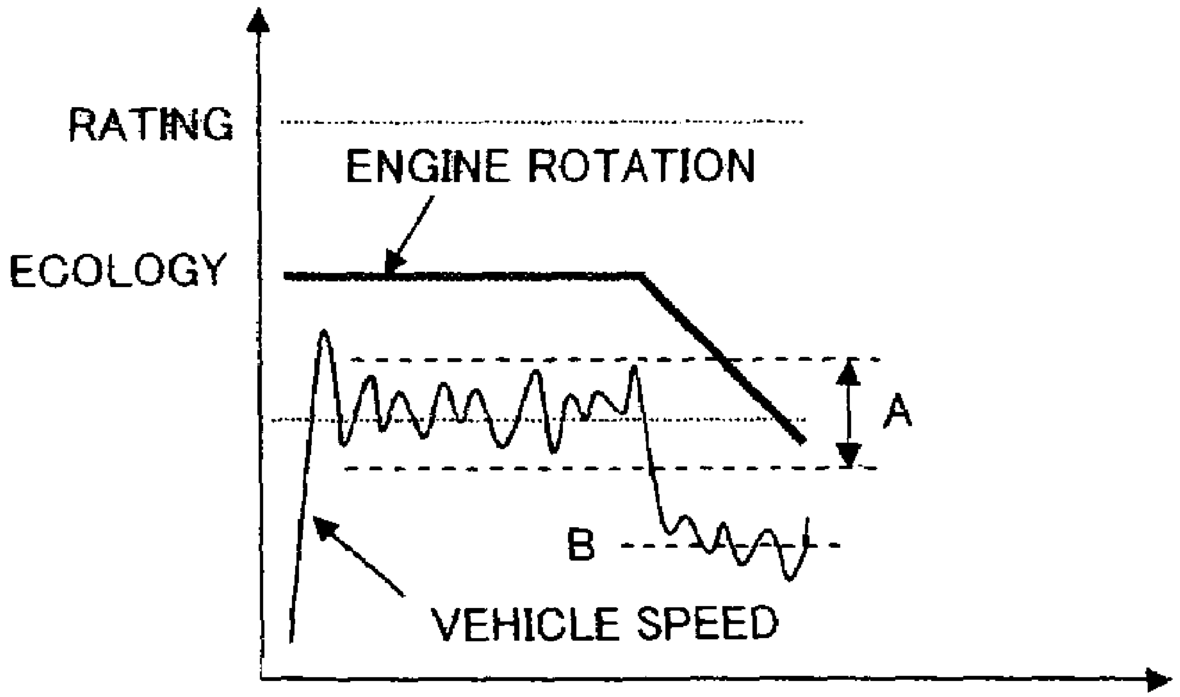
FIG. 2 is a graph showing a variation of vehicle speed under engine control related to the present invention.

The following is a description of how the engine is controlled when a workload is increased. FIG. 2 is a graph showing the variation of vehicle speed. Vehicle speed falls within a predetermined range A with a given variation width except for the transitional period of acceleration or deceleration because a feedback control is usually performed. When a workload increases to raise a torque being uncontrollable in the ECM 12, the rotational speed of the engine lowers to decrease the discharge quantity of the hydraulic pump in the hydraulic equipment 14 in the traveling system, thereby reducing the vehicle speed.

In the present embodiment, the on-board controller 13 monitors vehicle speed through the vehicle speed sensor 15. If the vehicle speed falls outside the predetermined range A that is a normal variation width and consequently drops to a dangerous range B, the on-board controller 13 then determines that the vehicle speed is reduced due to increase in workload.

Since sudden reduction in vehicle speed during paving work adversely affects the flatness of a paved surface, the on-board controller 13 commands the ECM 12 to switch the mode from the energy saving mode or "eco-mode" to the normal mode or rated speed to increase the rotational speed of the engine when the vehicle speed falls outside the predetermined range A and then inside the dangerous range B.

Various controlling methods are conceivable of increasing the rotational speed of the engine by switching the energy saving mode to the normal mode.

Method 1

Figure 3:
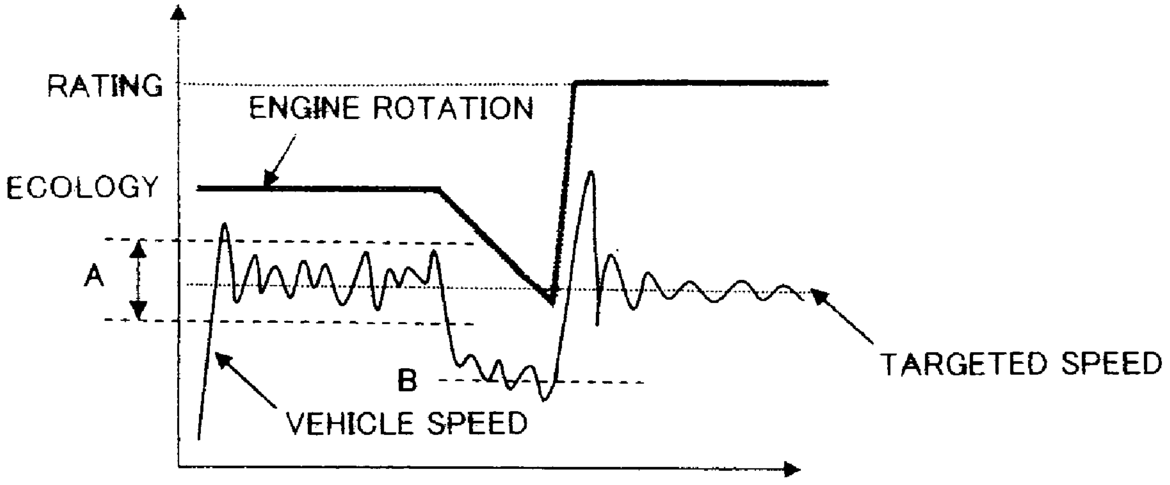
FIG. 3 is a graph showing one example of engine control related to the present invention.
Figure 4:
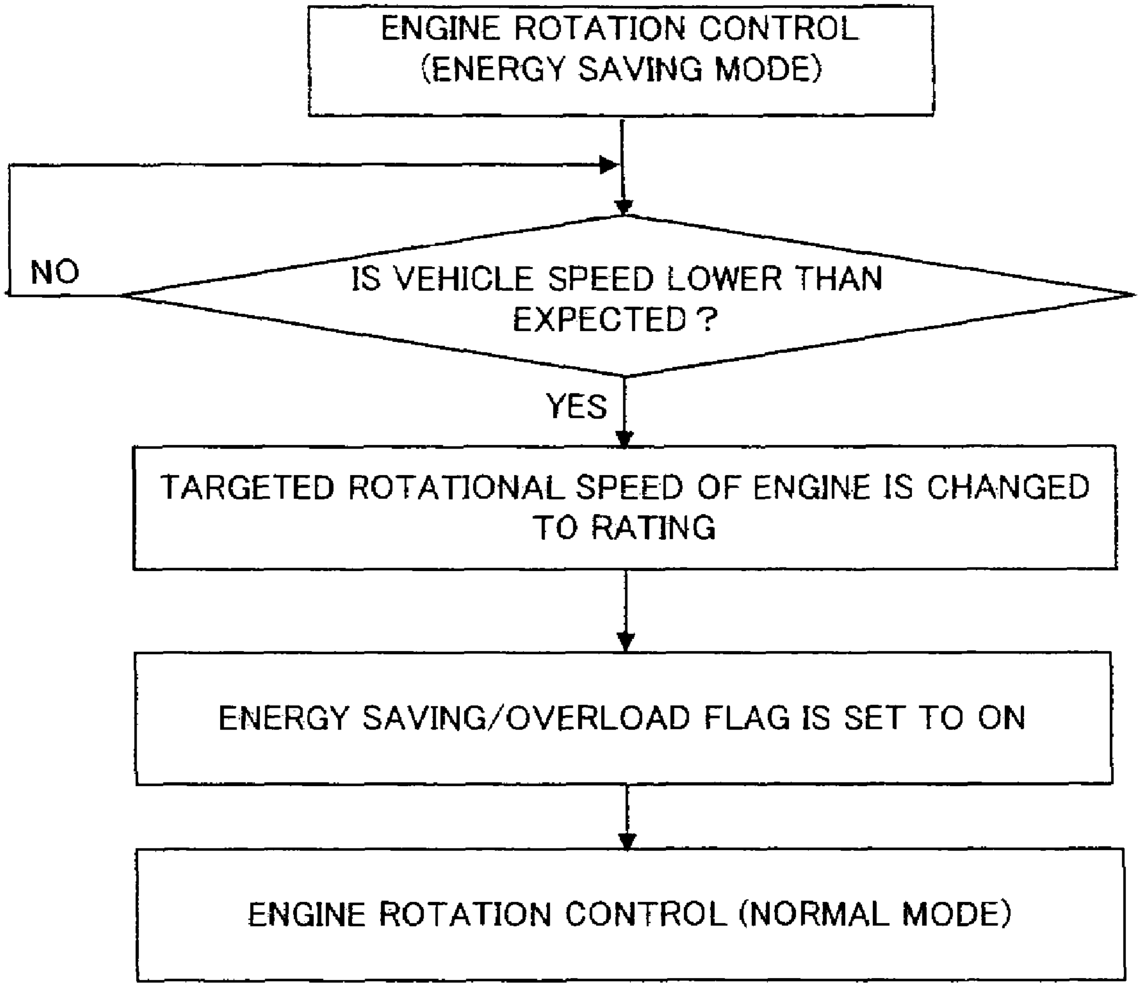
FIG. 4 shows a flow chart of engine control described in FIG. 3.

The on-board controller 13 commands the ECM 12 to quickly increase the vehicle speed of the engine 11 to the maximum rated speed. As shown in FIGS. 3 and 4, when vehicle speed changes less than expected or falls within the range A, the energy saving mode is maintained by feedback control; and when vehicle speed changes more than expected or drops into the range B, the rotational speed of the engine is quickly increased to the maximum rated speed.

At this point, the vehicle speed momentarily becomes higher than a targeted speed, the feedback control causes the speed to converge at the targeted speed. An energy saving/overload flag is set to "ON," in order to distinguish the normal mode shifted from the energy saving mode due to overload from a usual normal mode.

Method 2

Figure 5:
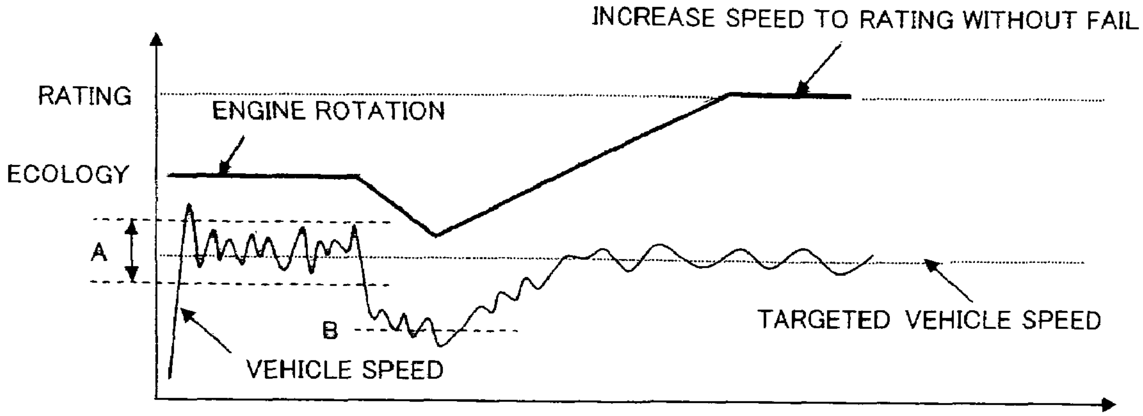
FIG. 5 is a graph showing another example of engine control related to the present invention.
Figure 6:
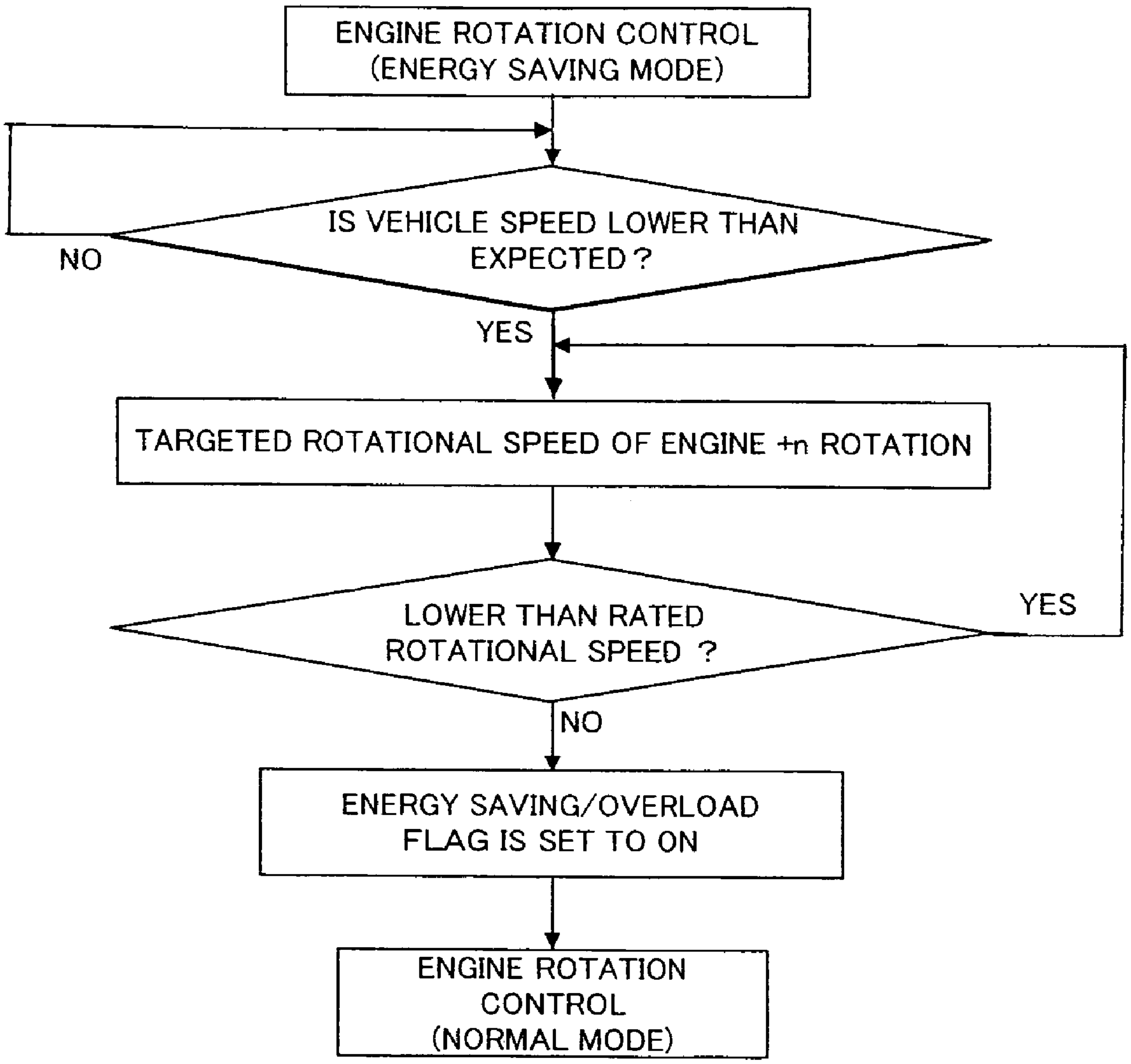
FIG. 6 shows a flow chart of engine control described in FIG. 5.

The on-board controller 13 commands the ECM 12 to cause the engine 11 to gradually increase vehicle speed to the maximum rated speed. As shown in FIGS. 5 to 6, when vehicle speed changes less than expected or falls within the range A, the energy saving mode is maintained by feedback control; and when vehicle speed changes more than expected or falls outside the range B, the rotational speed of the engine is gradually increased at a predetermined constant rate to the maximum rated speed regardless of loading state and vehicle speed to cause the feedback control to follow up to prevent the vehicle speed from suddenly changing.

Figure 7:
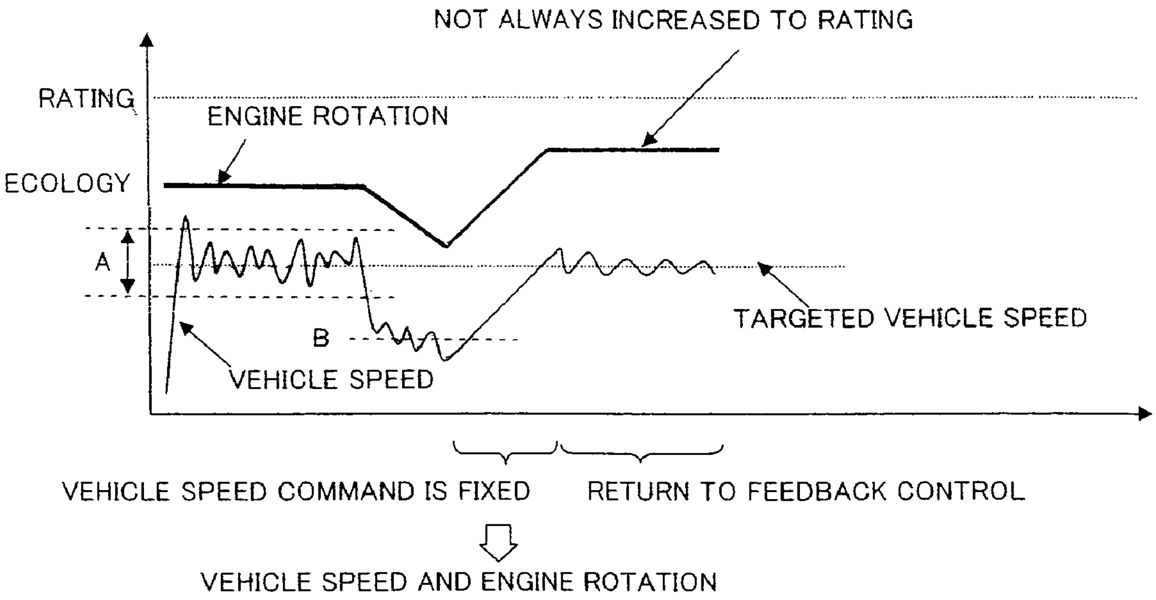
FIG. 7 is a graph showing another example of engine control related to the present invention.
Figure 8:
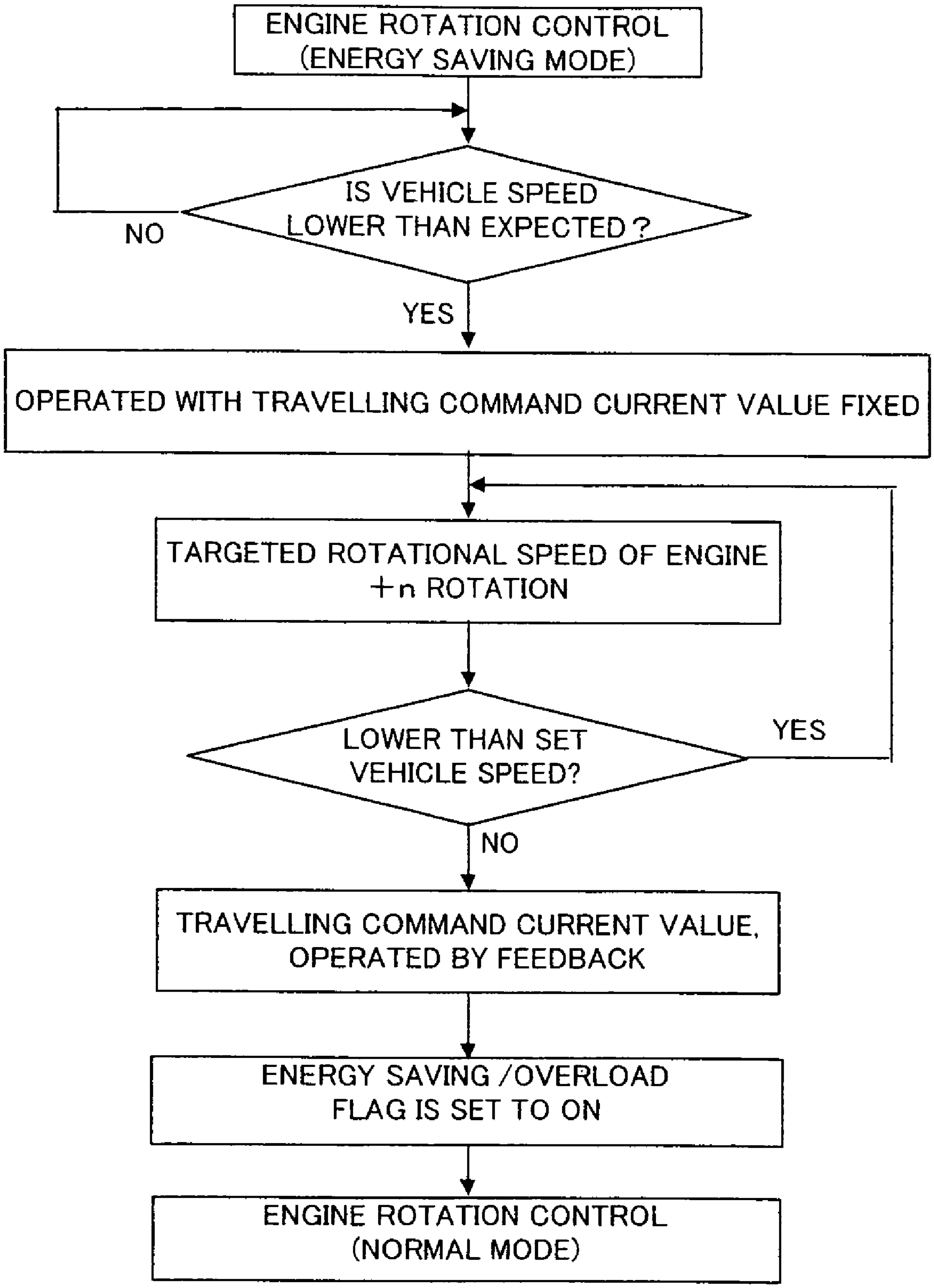
FIG. 8 shows a flow chart of engine control described in FIG. 7.

Alternatively, as shown in FIGS. 7 to 8, when the vehicle speed has gradually increased and reached the targeted speed with the command current of vehicle speed fixed constant, the rotational speed stops increasing and thereafter is subjected to feedback control. That is to say, the feedback control is performed with vehicle speed monitored. The rotational speed is in the normal mode, but not always increase to the maximum rated speed. In any case of the above, the energy saving mode is shifted to the normal mode owing to overload, an energy saving/overload flag needs setting to "ON."

Method 3

The rotational speed of the engine is increased by decreasing load in a working system when paving work is performed in a lower speed. In a case where the hydraulic equipment in the working system for driving a conveyer, a screw spreader and the like is controlled with a flow rate constant, the engine starting lowering in rotational speed due to load causes a shortage of flow rate, so that it is attempted to increase the discharge quantity of the hydraulic pump, this however further increases load on the engine, raising the risk of stalling.

Figure 9:
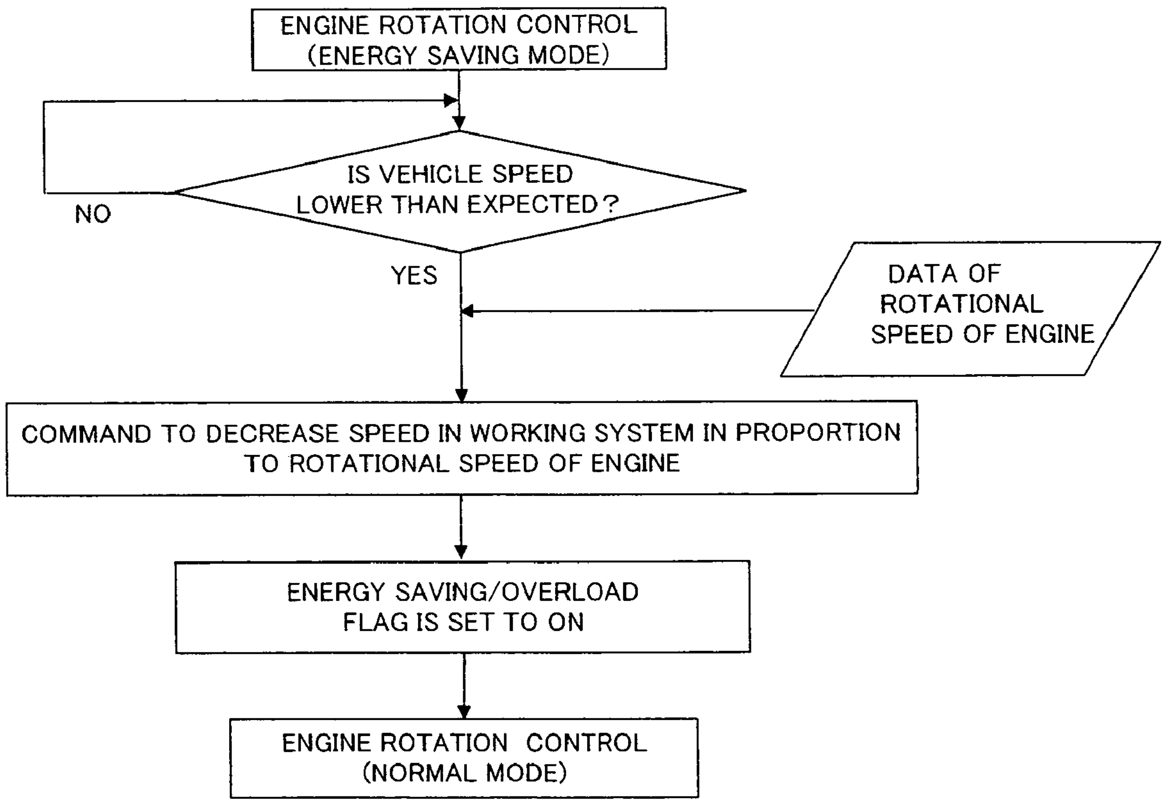
FIG. 9 is a graph showing another example of engine control related to the present invention.

As shown in FIG. 9, the hydraulic equipment in the working system is commanded to temporarily lower its speed in proportion to the rotational speed of the engine to decrease the load applied to the engine and to return to its original speed after the rotational speed of the engine has been increased. In this case also, the energy saving mode is shifted to the normal mode owing to overload, an energy saving/overload flag needs setting to "ON."

Thus, several controlling methods are conceivable of increasing the rotational speed of the engine by switching the energy saving mode to the normal mode when vehicle speed is decreased. The controlling method described in the above method 1 is not preferable because sudden increase in the rotational speed of the engine sudden increases vehicle speed, adversely affecting the flatness on the paved surface. For this reason, it is preferable to increase the rotational speed of the engine with use of the methods described in the above methods 2 and 3.

As described above, when the vehicle speed is increased to the predetermined range A by decreasing the work load after the rotational speed of the engine has been switched to the normal mode, the on-board controller 13 commands the ECM 12 to switch the normal mode to the energy saving mode to lower the rotational speed of the engine to save fuel.

Several methods are conceivable of decreasing the rotational speed of the engine by switching the normal mode to the energy saving mode. As for the timing for returning to the energy saving mode, Method 1

Figure 10:
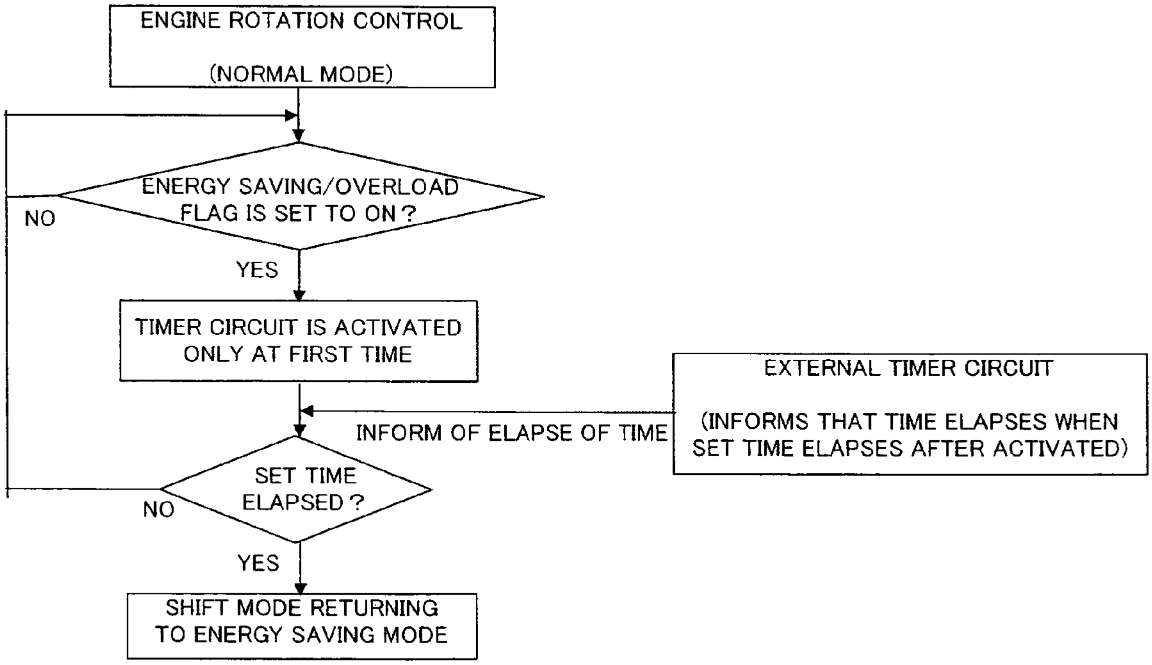
FIG. 10 is a graph showing one example in returning to the energy saving mode under engine control related to the present invention.

When a predetermined time elapses after the energy saving mode has been switched to the normal mode without observing the state of load, the rotational speed of the engine in the normal mode is returned to that in the energy saving mode. As shown in FIG. 10, when an energy saving/overload flag is set to "ON" in the normal mode, a timer circuit is activated only at the first time. The normal mode is returned to the energy saving mode with use of the method described later after a predetermined time elapses.

Method 2

Figure 11:
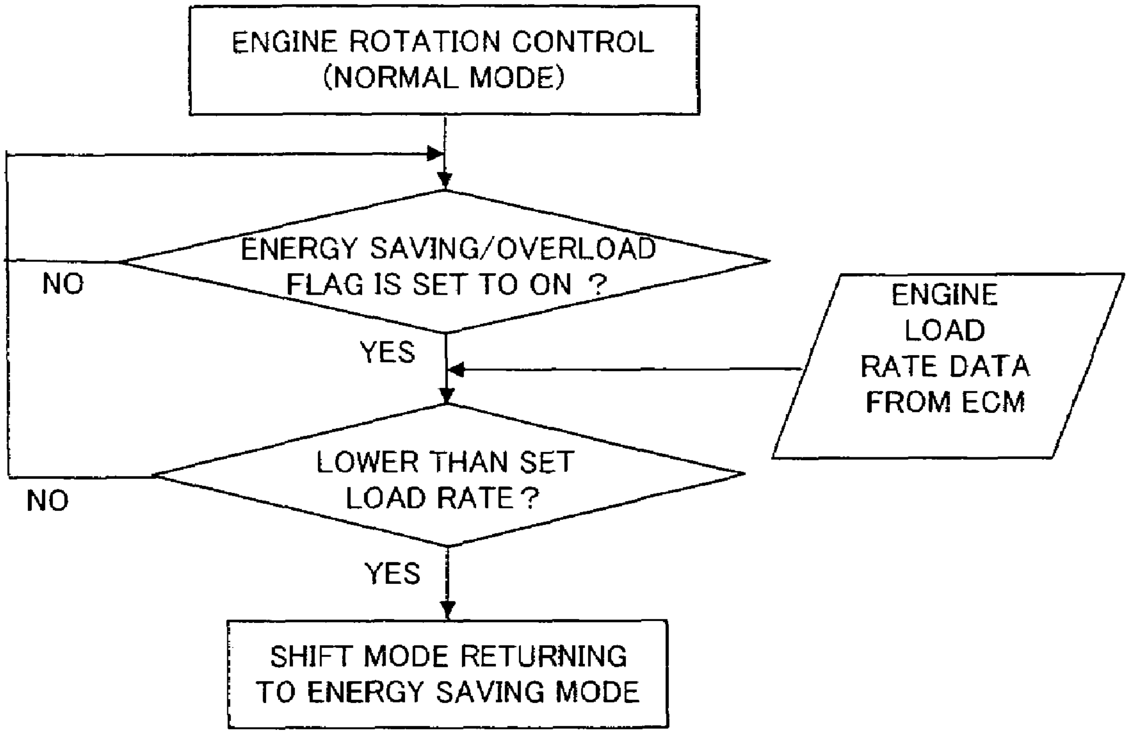
FIG. 11 is a graph showing another example in returning to energy saving mode at engine control related to the present invention.

The on-board controller 13 monitors an engine load rate sent from the ECM 12. When the load rate is below a specified value, the rotational speed of the engine in the normal mode is returned to that in the energy saving mode. As shown in FIG. 11, when an energy saving/overload flag is set to "ON" in the normal mode and when engine load rate is below a set value, the normal mode is returned to the energy saving mode with use of the method described later.

Method 3

Figure 12:
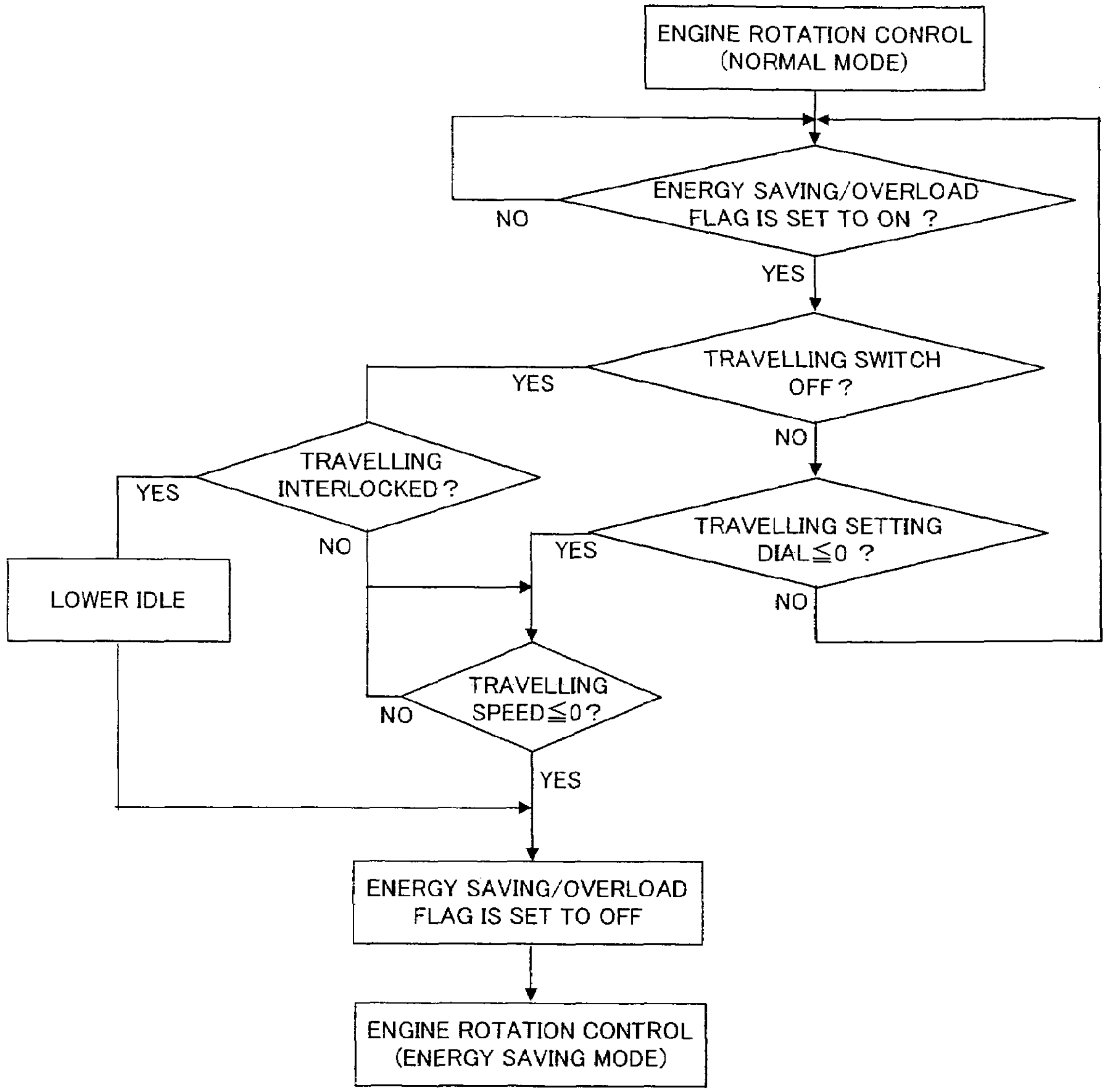
FIG. 12 is a graph showing another example in returning to energy saving mode at engine control related to the present invention.

The rotational speed of the engine in the normal mode is returned to that in the energy saving mode in interlock with a car body stopping traveling. That is to say, the normal mode is continued and not returned to the energy saving mode until information on the car body stopping traveling is obtained such as a traveling switch being set to "OFF, a speed set dial to "0" and a vehicle speed to "0." When the rotational speed of the engine is interlocked with the car body traveling, it is dropped to a lower idle mode. As shown in FIG. 12, when an energy saving/overload flag is set to "ON" in the normal mode, and if the traveling switch is set to "OFF, or the speed set dial to "0" or vehicle speed to "0," the car body stops traveling, from which it is determined that the load is reduced, and then the normal mode is returned to the energy saving mode. At this point, the energy saving/overload flag is set to "OFF."

Figure 13:
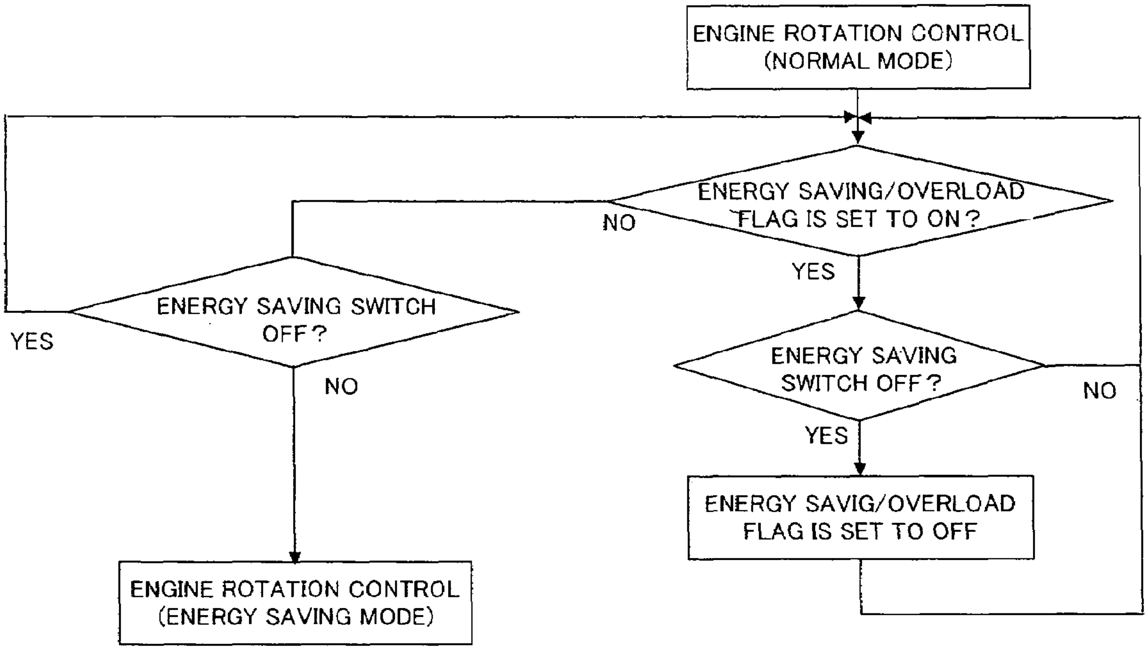
FIG. 13 is a graph showing another example in returning to energy saving mode at engine control related to the present invention.

Alternatively, once the energy saving mode switch has been set to "OFF," it is reset to be returned to the energy saving mode when the energy saving mode switch is again set to "ON." As shown in FIG. 13, when an energy saving/overload flag is set to "ON" in the normal mode, once the energy saving switch is set to "OFF" to release the energy saving mode, the energy saving/overload flag is set to "OFF," from which it is determined that it is specified to reduce the rotational speed of the engine by the intention of an operator, which instantly changes to the rotational speed of the engine set in the energy saving mode instead of an energy saving shift mode.

For the methods of returning the normal mode to the energy saving mode,

Method 1

Figure 14:
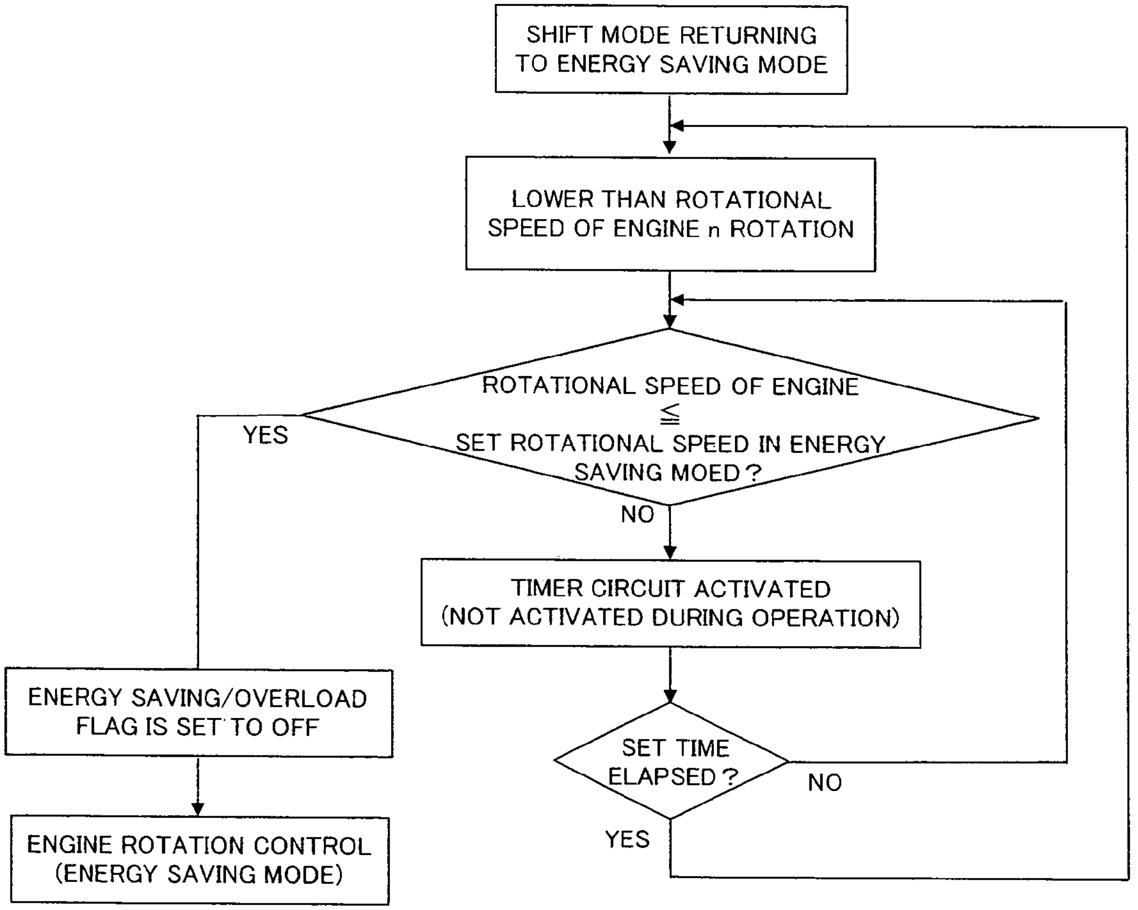
FIG. 14 is a graph showing another example in returning to energy saving mode at engine control related to the present invention.

The rotational speed of the engine is lowered to a set speed in the energy saving mode at a constant rate at which vehicle speed is not suddenly changed. As shown in FIG. 14, when the rotational speed of the engine becomes lower the speed set in the energy saving mode owing to increase in load or the like while the rotational speed of the engine is lowered to shift the normal mode to the energy saving mode, the mode is temporarily shifted to the energy saving mode. If a load is excessive as determined, then the energy saving mode is again switched to the normal mode.

Method 2

Figure 15:
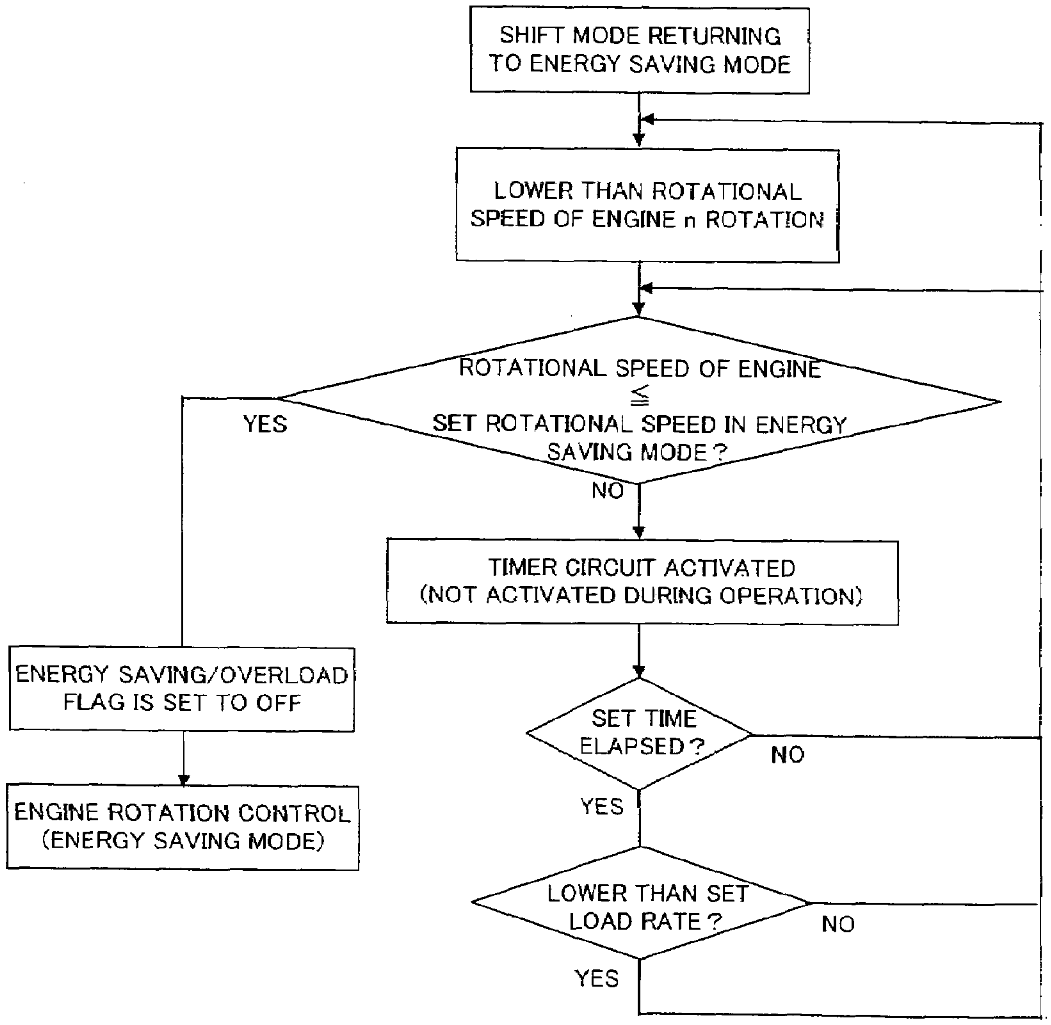
FIG. 15 is a graph showing another example in returning to energy saving mode at engine control related to the present invention.

The rotational speed of the engine is slightly reduced and kept for a while in order to observe an engine load. If the rotational speed of the engine can be further reduced, it is further slightly reduced. As shown in FIG. 15, the rotational speed of the engine may be slightly reduced with an engine load rate monitored while the rotational speed is lowered to shift the normal mode to the energy saving mode, thereby allowing the finisher to operate at the rotational speed around between the normal and the energy saving modes.

Returning the normal mode to the energy saving mode with use of any of the above timings and methods drops the rotational speed of the engine to reduce the fuel consumption and to contribute to energy saving. Thus, it is more convenient to use the machinery in the energy saving mode, increasing opportunities for use in the energy saving mode to suppress fuel consumption and noise.

In the present embodiment, while the vehicle speed sensor 15 detects the rotational speed of the hydraulic motor in the traveling system to calculate vehicle speed, the rotational sensor 16 may directly detect the rotational speed of the engine to determine workload.

It is to be understood that various modifications may be made without departing from the spirit of the present invention, and the scope of the present invention extends to all such modifications.

What is claimed is:

1. An engine controlling device for construction machinery for switchably controlling a rotational speed of an engine between a normal mode in a range of a higher rotational speed and an energy saving mode in a range of a lower rotational speed, comprising:

speed detecting means for detecting vehicle speed;

engine electronic controlling means for controlling the rotational speed of the engine; and an onboard controller for sending a command signal to the engine electronic controlling means based on a value detected by the speed detecting means to switch the rotational speed of the engine to either the normal mode or the energy saving mode; wherein when vehicle speed is changed by workload in the energy saving mode to be lower than a predetermined range, the on-board controller commands the engine electronic controlling means to switch the rotational speed of the engine to the normal mode.

2. The engine controlling device according to claim 1, wherein when workload is reduced to increase a vehicle speed to the predetermined range after the rotational speed of the engine has been switched to the normal mode, the on-board controller commands the engine electronic controlling means to switch the rotational speed of the engine to the energy saving mode.

3. A road paving construction machinery engine control device for adjusting engine speed due to changes in a vehicle speed caused by workload comprising:

a vehicle speed detector;

an engine rotational speed controller; and an on-board controller coupled to said vehicle speed detector and said engine rotational speed controller, wherein said on-board controller commands said engine rotational speed controller to increase the rotational speed of an engine to a normal mode from a lower engine speed energy savings mode when said vehicle speed detector detects a vehicle speed of the construction machinery to be lower than a predetermined vehicle speed range due to an increase in workload and said on-board controller commands said engine rotational speed controller to decrease the rotational speed of the engine to the lower engine speed energy saving mode when said vehicle speed detector detects the vehicle speed of the construction machinery higher than the predetermined vehicle speed range due to a decrease in workload, whereby opportunities for using the energy saving mode are increased reducing fuel consumption and noise and the vehicle speed is maintained within the predetermined vehicle speed range improving paved surface finish.

4. A method of controlling road paving construction machinery comprising the steps of:

placing an engine of the road paving construction machinery in a low engine speed energy savings mode;

detecting a vehicle speed of the road paving construction machinery;

determining if the vehicle speed falls below a predetermined vehicle speed range due to an increase in workload, whereby reduced road surface quality may result;

increasing a rotational speed of the engine if the vehicle speed falls below the predetermined vehicle speed range to a high engine speed normal mode sufficient so that the vehicle speed of the road paving construction machinery is within the predetermined vehicle speed range;

determining if the vehicle speed becomes higher than the predetermined vehicle speed range due to a decrease in workload, whereby reduced road surface quality may result; and decreasing the rotational speed of the engine if the vehicle speed becomes higher than the predetermined vehicle speed range to the low engine speed energy savings mode sufficient so that the vehicle speed of the road paving construction machinery is within the predetermined vehicle speed range, whereby opportunities for using the low engine speed energy saving mode are increased reducing fuel consumption and noise and the vehicle speed is maintained within the predetermined vehicle speed range improving paved surface finish.

* * * * *